United States Patent
Takeuchi et al.

(10) Patent No.: US 8,982,208 B2
(45) Date of Patent: Mar. 17, 2015

(54) MONITORING SYSTEM, IMAGE CAPTURING APPARATUS, ANALYSIS APPARATUS, AND MONITORING METHOD

(75) Inventors: Hideto Takeuchi, Tokyo (JP); Akihiro Hokimoto, Kanagawa (JP)

(73) Assignee: Sony Corporation, Tokyo (JP)

(*) Notice: Subject to any disclaimer, the term of this patent is extended or adjusted under 35 U.S.C. 154(b) by 932 days.

(21) Appl. No.: 12/765,390

(22) Filed: Apr. 22, 2010

(65) Prior Publication Data

US 2010/0295944 A1  Nov. 25, 2010

(30) Foreign Application Priority Data

May 21, 2009  (JP) ................................. 2009-123413

(51) Int. Cl.
*H04N 7/18* (2006.01)
*G06K 9/00* (2006.01)
*G06T 7/20* (2006.01)

(52) U.S. Cl.
CPC .......... *G06K 9/00771* (2013.01); *G06T 7/2093* (2013.01); *G06T 2207/10016* (2013.01); *G06T 2207/30232* (2013.01)
USPC ........... 348/143; 382/103; 709/201; 709/202; 709/203; 709/204; 709/205

(58) Field of Classification Search
CPC ... H04N 21/60; H04N 21/80; H04N 21/8126; H04N 21/8133; H04N 21/84; G06F 17/30017; G06F 17/30038; G06F 17/30244; G06F 17/30247; G06F 17/30781; G06F 17/30784; G06F 17/3079; G06F 17/30793
USPC ........................... 348/143; 382/103, 115–119; 709/201–205
See application file for complete search history.

(56) References Cited

U.S. PATENT DOCUMENTS

| | | | | |
|---|---|---|---|---|
| 5,243,418 | A * | 9/1993 | Kuno et al. .................... | 348/155 |
| 6,028,611 | A * | 2/2000 | Anderson et al. ............. | 345/506 |
| 6,438,576 | B1 * | 8/2002 | Huang et al. .................. | 709/202 |
| 6,833,865 | B1 * | 12/2004 | Fuller et al. ................. | 348/231.2 |
| 6,877,134 | B1 * | 4/2005 | Fuller et al. ................... | 715/202 |
| 7,106,364 | B1 * | 9/2006 | Noro et al. .................. | 348/211.3 |
| 7,460,149 | B1 * | 12/2008 | Donovan et al. ............. | 348/143 |
| 7,562,299 | B2 * | 7/2009 | Millar et al. .................. | 715/719 |

(Continued)

FOREIGN PATENT DOCUMENTS

| | | |
|---|---|---|
| JP | 8-251573 | 9/1996 |
| JP | 2006-217067 | 8/2006 |

(Continued)

*Primary Examiner* — David Lazaro
*Assistant Examiner* — Sarah Drabik
(74) *Attorney, Agent, or Firm* — Oblon, McClelland, Maier & Neustadt, L.L.P.

(57) ABSTRACT

Monitoring system is provided which includes an image capturing apparatus including a basic analysis section that performs analysis processing based on image data input from an image capturing section that captures an image of a subject and generates first metadata, and a first metadata output section that outputs the first metadata and second metadata different from the first metadata to a monitoring apparatus connected to a network via the network, and an analysis apparatus including an extended analysis section that performs analysis processing different from that of the basic analysis section based on the image data received from the image capturing apparatus and generates the second metadata, and a second metadata output section that outputs the second metadata to the image capturing apparatus.

13 Claims, 12 Drawing Sheets

(56) References Cited

U.S. PATENT DOCUMENTS

| | | | |
|---|---|---|---|
| 7,710,452 B1* | 5/2010 | Lindberg | 348/149 |
| 7,890,607 B2* | 2/2011 | Fujii | 709/219 |
| 7,982,795 B2* | 7/2011 | Spatharis | 348/376 |
| 2004/0081338 A1* | 4/2004 | Takenaka | 382/118 |
| 2004/0113933 A1* | 6/2004 | Guler | 345/716 |
| 2004/0130620 A1* | 7/2004 | Buehler et al. | 348/143 |
| 2004/0267788 A1* | 12/2004 | Taniguchi et al. | 707/100 |
| 2005/0024206 A1* | 2/2005 | Samarasekera et al. | 340/541 |
| 2005/0213793 A1* | 9/2005 | Oya et al. | 382/103 |
| 2006/0034586 A1* | 2/2006 | Millar et al. | 386/69 |
| 2006/0193534 A1* | 8/2006 | Hirose | 382/291 |
| 2007/0070240 A1* | 3/2007 | Oya | 348/375 |
| 2007/0296817 A1* | 12/2007 | Ebrahimi et al. | 348/161 |
| 2008/0007624 A1* | 1/2008 | Schultz et al. | 348/207.99 |
| 2008/0024609 A1* | 1/2008 | Konishi | 348/159 |
| 2008/0036917 A1* | 2/2008 | Pascarella et al. | 348/702 |
| 2008/0189396 A1* | 8/2008 | Fujii | 709/219 |
| 2008/0229213 A1* | 9/2008 | Hamilton et al. | 715/751 |
| 2009/0016576 A1* | 1/2009 | Goh et al. | 382/118 |
| 2009/0132583 A1* | 5/2009 | Carter et al. | 707/104.1 |
| 2009/0234810 A1* | 9/2009 | Angell et al. | 707/3 |
| 2010/0013931 A1* | 1/2010 | Golan et al. | 348/150 |
| 2010/0111377 A1* | 5/2010 | Monroe | 382/118 |
| 2010/0332677 A1* | 12/2010 | Tian | 709/233 |
| 2011/0050901 A1* | 3/2011 | Oya | 348/143 |

FOREIGN PATENT DOCUMENTS

| | | |
|---|---|---|
| JP | 2007-158421 | 6/2007 |
| JP | 2008-16895 | 1/2008 |
| JP | 2008-33542 | 2/2008 |
| JP | 2008-85832 | 4/2008 |
| JP | 4148285 | 7/2008 |

* cited by examiner

THIRD CAMERA

SECOND CAMERA

FIRST CAMERA

THIRD CAMERA

SECOND CAMERA

FIRST CAMERA

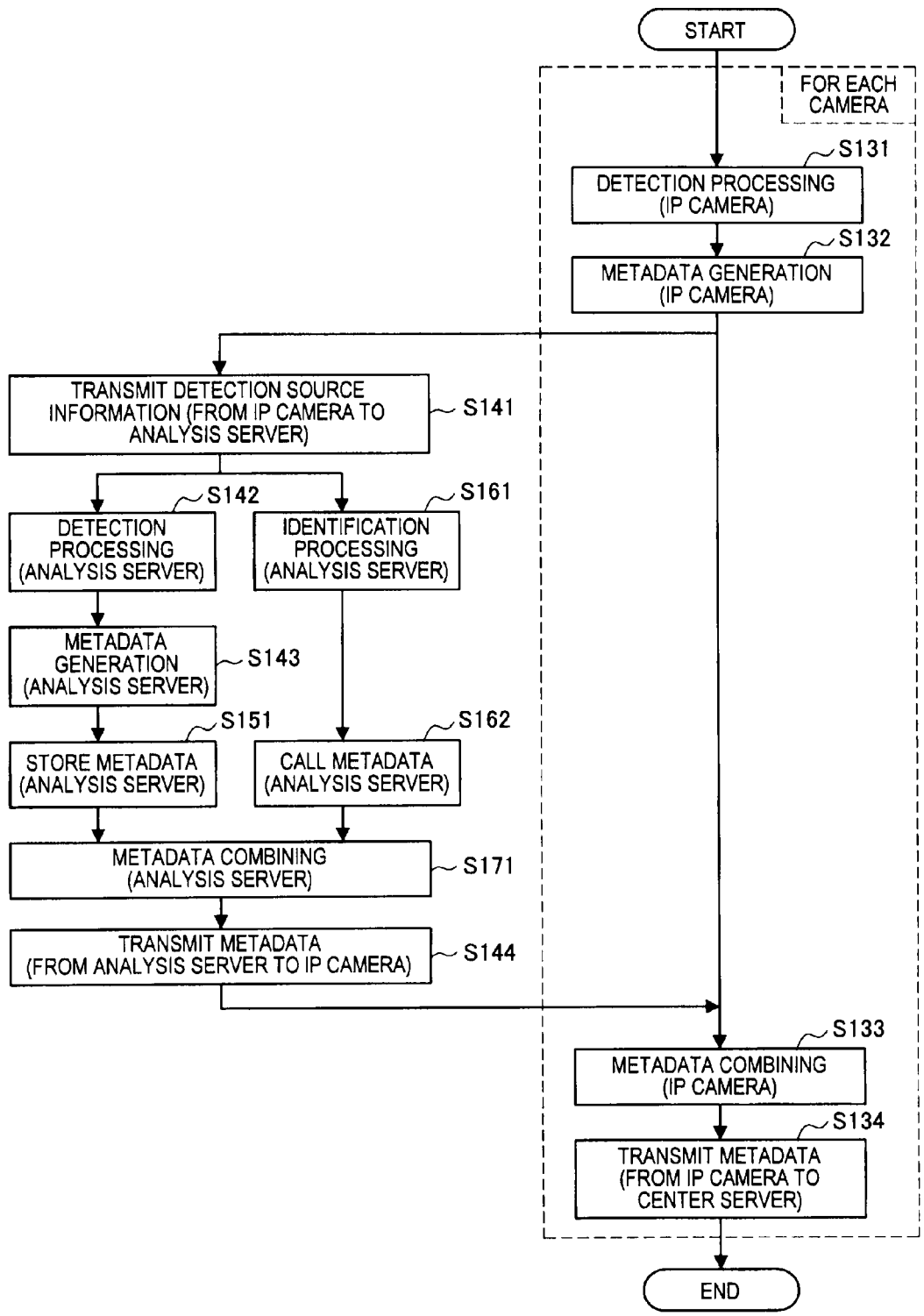

MONITORING SYSTEM, IMAGE
CAPTURING APPARATUS, ANALYSIS
APPARATUS, AND MONITORING METHOD

BACKGROUND OF THE INVENTION

1. Field of the Invention

The present invention relates to a monitoring system, an image capturing apparatus, an analysis apparatus, and a monitoring method.

2. Description of the Related Art

There is a monitoring system which includes a monitoring camera (hereinafter also referred to as "IP camera") having a wired or wireless LAN function and a monitoring apparatus (hereinafter also referred to as "center server") controlling and monitoring a plurality of IP cameras, and the IP cameras and the center server are connected to each other via a network. In the monitoring system, the IP camera transmits captured image data to the center server via the network. The center server records the received image data, detects an occurrence of an abnormality by analyzing the image data, and outputs an alarm. In this way, an observer can perform monitoring while checking image data displayed on a monitor and the details of the alarm output by the center server.

Japanese Patent No. 4148285 discloses a technique related to object recognition when a monitoring apparatus monitors image data and outputs an alarm.

SUMMARY OF THE INVENTION

In a monitoring system, there is a case in which an IP camera includes an analysis processing section (for example, moving object detection processing section) and the IP camera generates metadata and event in order to distribute processing throughout the entire system.

In a monitoring center (center server), an observer monitors images of each IP camera by on-line or off-line. In recent years, the observer monitors only an analysis result (metadata or event) obtained from IP cameras, each of which has an analysis function, in order to easily monitor many cameras.

However, when the analysis processing is performed by only a resource (CPU performance, memory size, and the like) in an IP camera, it is difficult to perform sufficient processing. To cause each IP camera to perform the analysis processing, it is desired for the IP cameras to have hardware such as a high-performance CPU and memory.

Currently, although simple processing such as moving object detection is performed in the IP camera, complex processing such as face recognition, vehicle recognition, and matching processing which uses a large amount of memory is not performed in the IP camera.

In light of the foregoing, it is desirable to provide a novel and improved monitoring system, image capturing apparatus, analysis apparatus, and monitoring method which can efficiently perform analysis processing in a monitoring system including an image capturing apparatus.

According to an embodiment of the present invention, there is provided a monitoring system including an image capturing apparatus including a basic analysis section that performs analysis processing based on image data input from an image capturing section that captures an image of a subject and generates first metadata, and a first metadata output section that outputs the first metadata and second metadata different from the first metadata to a monitoring apparatus connected to a network via the network, and an analysis apparatus including an extended analysis section that performs analysis processing different from that of the basic analysis section based on the image data received from the image capturing apparatus and generates the second metadata, and a second metadata output section that outputs the second metadata to the image capturing apparatus.

The monitoring system may include a plurality of the image capturing apparatuses. The analysis apparatus further may include a metadata combining section that combines the second metadata generated based on the image data from one of the image capturing apparatuses and the second metadata generated based on the image data from another one of the image capturing apparatuses, and the second metadata output section outputs the combined metadata to the one of the image capturing apparatuses.

The analysis apparatus may include a plurality of the extended analysis sections, and each extended analysis section performs different analysis processing and generates different second metadata, the analysis apparatus further may include a metadata combining section that combines the second metadata generated by each extended analysis section to generate combined metadata, and the second metadata output section may output the combined metadata to the image capturing apparatuses.

According to an embodiment of the present invention, there is provided an image capturing apparatus including a basic analysis section that performs analysis processing based on image data input from an image capturing section that captures an image of a subject to generate first metadata, and a first metadata output section that outputs the first metadata and second metadata generated in an extended analysis section in an analysis apparatus by performing analysis processing different from that of the basic analysis section based on the image data received from the image capturing apparatus to a monitoring apparatus connected to a network via the network.

The image capturing apparatus may further include a metadata combining section that combines the first metadata and the second metadata to generate combined metadata. The first metadata output section may output the combined metadata to the monitoring apparatus.

According to an embodiment of the present invention, there is provided an analysis apparatus including an extended analysis section that receives image data from a plurality of image capturing apparatuses that have a basic analysis section that performs analysis processing based on the image data input from an image capturing section that captures an image of a subject and generates first metadata and a first metadata output section that outputs the first metadata and second metadata different from the first metadata to a monitoring apparatus connected to a network via the network, and performs analysis processing different from that of the basic analysis section based on the received image data to generate the second metadata, and a second metadata output section that outputs the second metadata to the image capturing apparatuses.

The analysis apparatus may further include a metadata combining section that combines the second metadata generated based on the image data from one of the image capturing apparatuses and the second metadata generated based on the image data from another one of the image capturing apparatuses. The second metadata output section outputs the combined metadata to the image capturing apparatuses.

The analysis apparatus may include a plurality of the extended analysis sections, and each extended analysis section may perform different analysis processing and generates different second metadata. The analysis apparatus may further include a metadata combining section that combines the second metadata generated by each extended analysis section to generate combined metadata, and the second metadata output section outputs the combined metadata to the image capturing apparatuses.

According to an embodiment of the present invention, there is provided a monitoring method comprising the steps of performing analysis processing based on image data input from an image capturing section that captures an image of a subject and generating first metadata by an image capturing apparatus, performing analysis processing based on the image data received from the image capturing apparatus and generating second metadata different from the first metadata by an analysis apparatus, outputting the second metadata to the image capturing apparatus by the analysis apparatus, and outputting the first metadata and the second metadata to a monitoring apparatus connected to a network via the network by the image capturing apparatus.

According to an embodiment of the present invention, in a monitoring system including an image capturing apparatus, it is possible to efficiently perform analysis processing.

BRIEF DESCRIPTION OF THE DRAWINGS

FIG. 9 is an explanatory diagram illustrating captured image examples of a person Obj1 and a vehicle Obj2 captured by each IP camera 100;

FIG. 11 is a flowchart illustrating an operation related to collaboration between a plurality of IP cameras 100 and the analysis server 130 according to the embodiment.

DETAILED DESCRIPTION OF THE EMBODIMENT(S)

Figure 1:
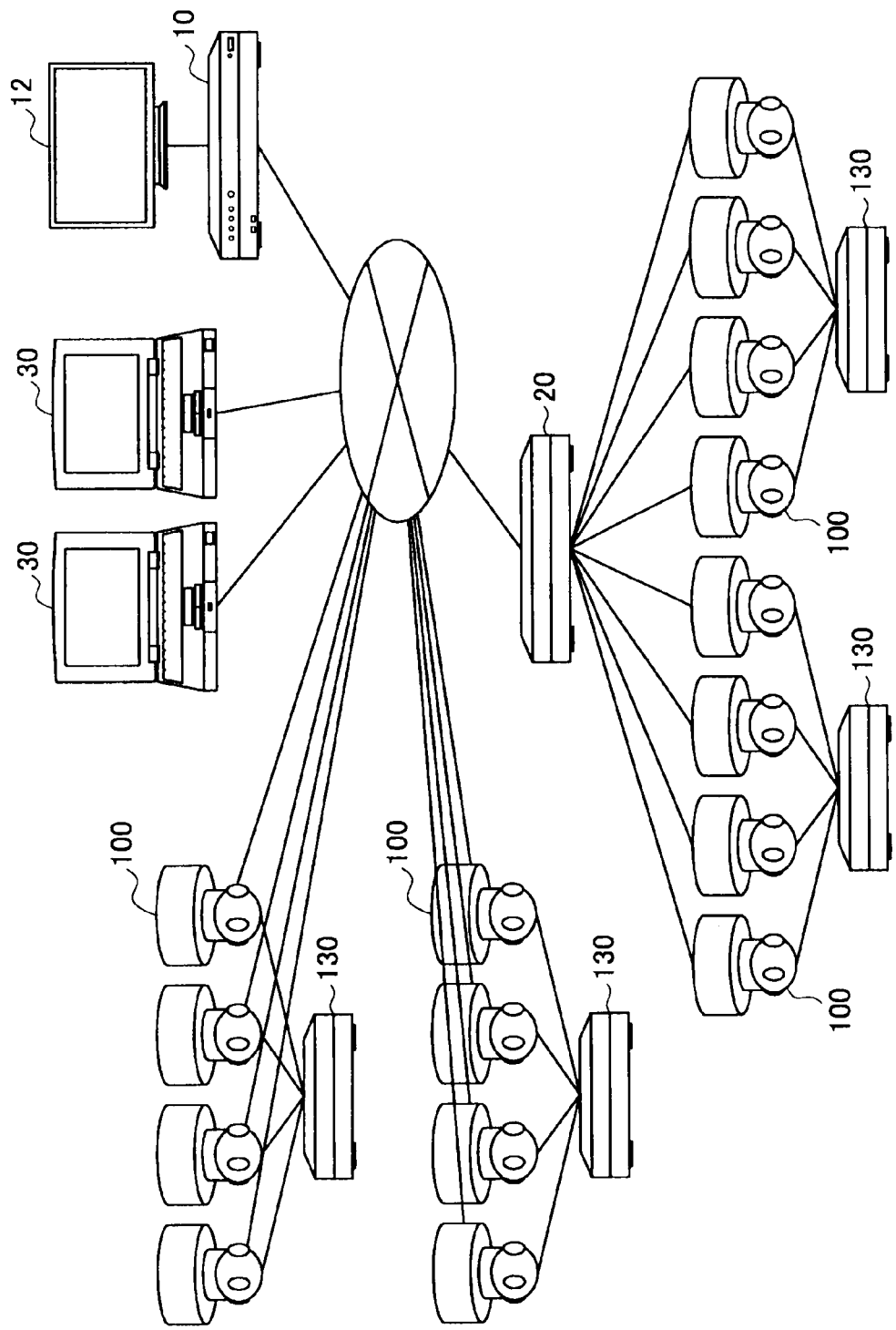
FIG. 1 is an explanatory diagram illustrating a configuration and a connection example of a monitoring system according to an embodiment of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

The description will be made in the following order:
1. An embodiment
1-1. Configuration of the monitoring system
1-2. Analysis processing method using the IP camera 100 and the analysis server 130
1-3. Metadata generation method by the analysis server 130
1-4. Detection processing in the monitoring system
1-5. Detection processing using the analysis server 130 in the monitoring system
1-6. Collaboration method between the IP camera 100 and the analysis server 130
1-7. Relationship between a plurality of IP cameras 100 and the analysis server 130
1-8. Operation related to collaboration between a plurality of IP cameras 100 and the analysis server 130
1-9. About viewer
1-10. Effects of the embodiment 1. An Embodiment Configuration of the Monitoring System First, a configuration of the monitoring system according to an embodiment of the present invention will be described. FIG. 1 is an explanatory diagram illustrating a configuration and a connection example of the monitoring system according to the embodiment.

The monitoring system according to the embodiment includes, for example, a plurality of IP cameras 100, an analysis server 130, a center server 10 which controls the IP cameras 100 in a center, a monitor 12, a client terminal 30 which can access the center server 10, a proxy server 20 which relays data from the IP cameras 100, a network which is used to transmit data, and the like. The IP camera 100 is an example of an image capturing apparatus, and the analysis server 130 is an example of an analysis apparatus. The center server is an example of a monitoring apparatus.

As an improvement of the related art, it is considered that a part of analysis processing in the monitoring system is assigned to an external analysis server. However, even when an external server is used, in order to respond to loads of each server and an increase of the number of the cameras that can be connected, it is desired to efficiently reduce the load of the analysis server. Therefore, in this embodiment, the analysis server 130 which complements the resource of the IP camera 100 is added to the monitoring system. The analysis server 130 is directly connected to a plurality of IP cameras 100, and functions as if the center server 10 connects to only the IP camera 100 when seen from the center server 10.

This embodiment is characterized in that, by integrating analysis processing results generated in each IP camera 100 in the analysis server 130 based on installation information of the plurality of IP cameras 100, and returning the integrated result to the IP cameras 100, the center server 10 can receive metadata and event as if they were generated by one IP camera 100 which performed all the processing.

[Analysis Processing Method Using the IP Camera 100 and the Analysis Server 130]

First, an analysis processing method using the IP camera 100 and the analysis server 130 will be described.

The IP camera 100 is a camera connected to a network in accordance with the IP (Internet Protocol).

In this specification, a server connected to the monitor 12 which is directly monitored by an observer and on which a displayable viewer is installed is referred to as "center server 10". The center server 10 can monitor all the IP cameras 100 via the viewer, and can manage recording data of the all the cameras with a recorder included in the center server 10.

The analysis server 130 is provided for every plurality of IP cameras 100, and performs analysis processing which is not included in the IP cameras 100.

The proxy server 20 manages some IP cameras 100 as a group, and relays data between the center server 10 and the IP cameras 100.

The observer sends a detection request from the center server 10 to each IP camera 100, and monitors metadata and event from the IP cameras 100 through the viewer. At this time, the observer (center server 10) need not be conscious of the presence of the analysis server 130. The center server 10 recognizes that the center server 10 directly connects to the IP cameras 100. The observer may perform an operation such as monitoring using the client terminal 30.

Figure 2:
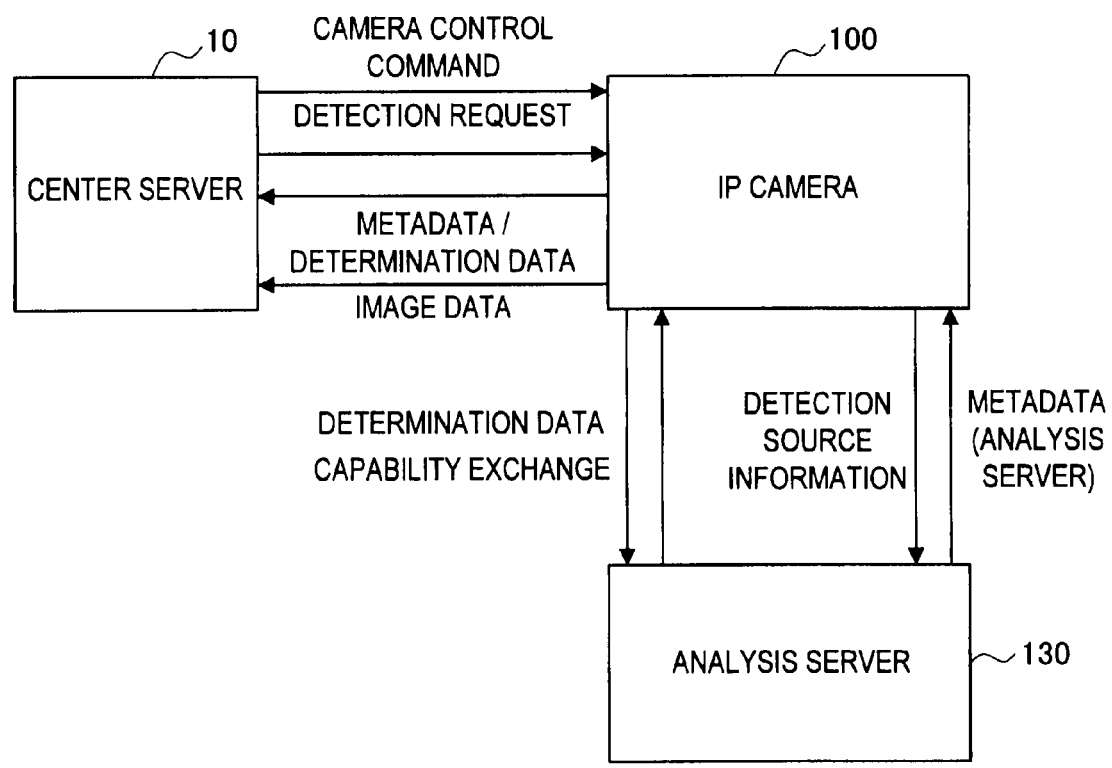
FIG. 2 is a connection block diagram illustrating a relationship between a center server 10, an IP camera 100, and an analysis server 130.

FIG. 2 illustrates a relationship between the servers. FIG. 2 is a connection block diagram illustrating a relationship between the center server 10, the IP camera 100, and the analysis server 130. Here, for the sake of simplicity, the description of the proxy server 20 will be omitted. The proxy server 20 is between the center server 10 and the IP cameras 100 and has a role of transmitting a detection request and metadata as a basic function thereof.

By an instruction from a user, the center server 10 sends a detection request corresponding to the instruction to the IP camera 100 by using a GUI (Graphical User Interface) or a command. The IP camera 100 transmits a detection result as metadata to the center server 10 in accordance with the instruction. As a normal monitoring function, image data captured by the IP camera is transmitted to the center server 10. Camera control command and the like other than the detection request are also transmitted from the center server 10 to the IP camera 100.

The format of metadata transmitted from the IP camera 100 is predetermined. For example, binary format or XML format is used. Regarding the transmitted content, metadata as described in Table 1 is transmitted when a person is detected.

TABLE 1

| Name | Meaning |
| --- | --- |
| Detection ID | Serial number |
| Circumscribed rectangle | Frame circumscribing target object (top edge, bottom edge, right edge, left edge) |
| Head position | Position of head (x, y) |
| Head orientation | Orientation of head (roll, pitch, yaw) |
| Positions of face parts | Positions of eyes, nose, and mouth |
| Face score | Faceness calculated during detection |
| Face attribute | Attribute related to face such as male/female, race, age, smile, and the like |
| Recognition feature amount | Color, image feature (edge pattern or the like), and feature amount used for recognition by comparing with other metadata |

In a similar way, when a vehicle is detected, metadata such as moving direction, color, type of the vehicle, and license plate number is transmitted. Further, for example, when an event such as, an object enters a certain area, or the object passes through a certain virtual line, is determined by a rule engine by analyzing the metadata, the event is transmitted.

It is difficult for current IP cameras to have an analysis processing function which can process all the metadata as described above in one camera owing to a restriction of CPU, memory, and the like. For example, currently, a moving object detection function which detects a portion moving in a display screen is included in an IP camera. However, it is difficult for the IP camera to include a function more than the above due to resource shortage.

[Metadata Generation Method by the Analysis Server 130]

Next, a metadata generation method using the analysis server 130 which complements the capability of the IP camera 100 will be described.

As illustrated in FIG. 2, the IP camera 100 returns metadata responding to a request from the center server 100. At this time, the IP camera 100 exchanges capabilities with the analysis server 130. The analysis server 130 performs the analysis processing which the IP camera 100 does not have the capability to perform, the IP camera 100 receives the result of the analysis processing from the analysis server 130, and the IP camera 100 returns the result as metadata to the center server 10.

Figure 3:
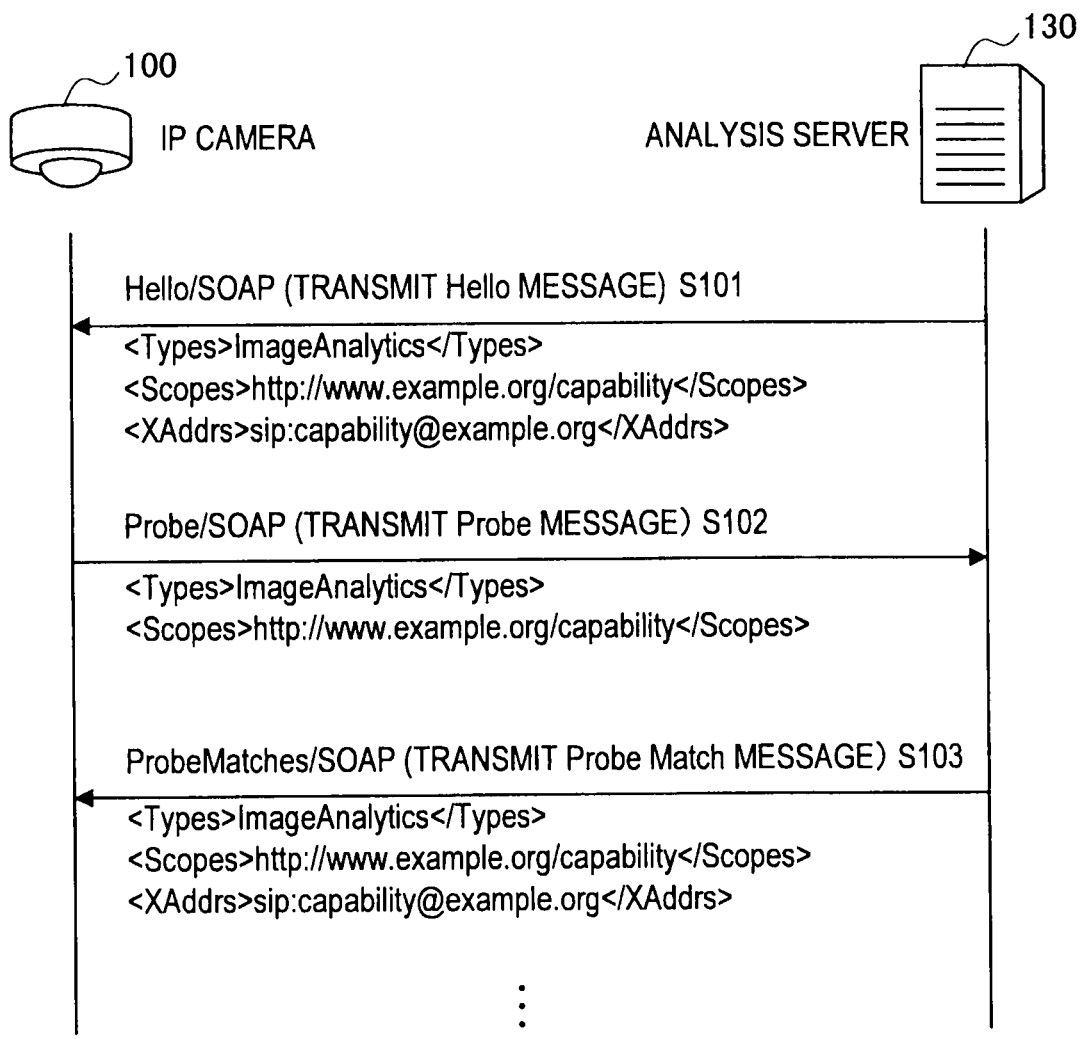
FIG. 3 is a flowchart illustrating an example of capability exchange between the IP camera 100 and the analysis server 130.

It is possible to exchange information indicating which capabilities are included between the IP camera 100 and the analysis server 130 in advance. For example, in a way as illustrated in FIG. 3, capability exchange can be performed. FIG. 3 is a flowchart illustrating an example of capability exchange between the IP camera 100 and the analysis server 130. FIG. 3 illustrates an example in which SOAP, which is a protocol for exchanging messages (objects), is used between software programs.

First, the analysis server 130 calls the IP camera 100 (step S101), and the IP camera 100 responds to the call (step S102). Then, the analysis server 130 responds to the IP camera 100 which responds to the call in step S103.

[Detection Processing in the Monitoring System]

Figure 4:
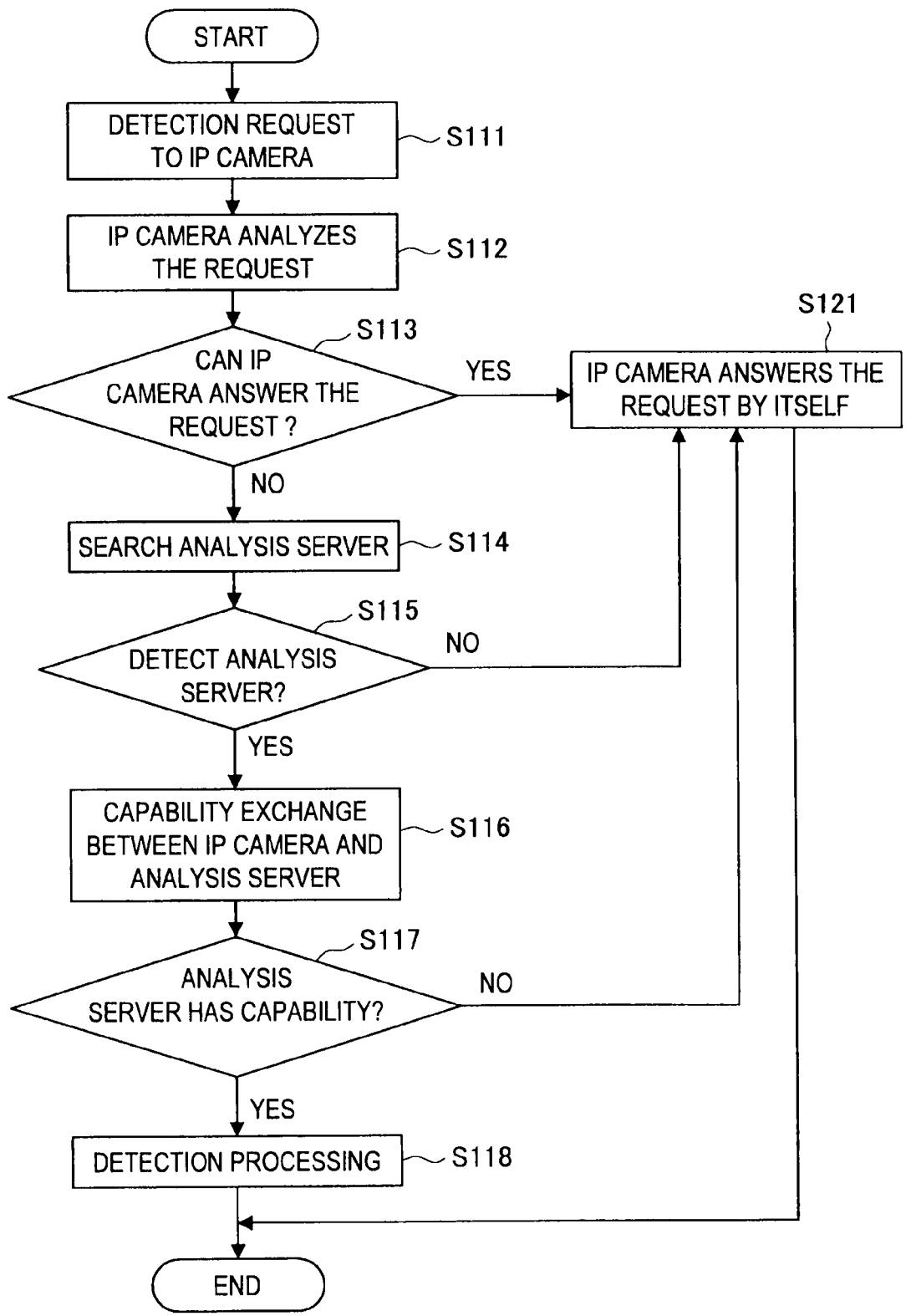
FIG. 4 is a flowchart illustrating detection processing in the monitoring system according to the embodiment.

Next, detection processing in the monitoring system according to the embodiment will be described. FIG. 4 is a flowchart illustrating the detection processing in the monitoring system according to the embodiment.

First, the center server 10 sends a detection request to the IP camera 100 (step S111). Then, the IP camera 100 analyzes the request (step S112). By analyzing the request, the IP camera 100 determines whether the request can be answered by the IP camera itself (step S113). If the request can be answered, the IP camera 100 answers the request by itself (step S121).

On the other hand, if the request cannot be answered, the IP camera 100 searches the analysis server 130 (step S114). When the IP camera 100 cannot find the analysis server 130 (step S115), the IP camera 100 creates and returns metadata by using the capability included only in the IP camera 100 (step S121). In this case, insufficient part of the metadata is emptied or ignored, and transmitted.

When the IP camera 100 can find the analysis server 130 (step S115), the IP camera 100 exchanges capabilities with the analysis server 130 (step S116). When the analysis server 130 does not have capability to perform the requested processing, for example when the requested processing is different from the processing (for a person or for a vehicle) which can be performed by the analysis server 130 (step S117), the IP camera 100 creates and returns metadata by using the capability included only in the IP camera 100. In this case, insufficient part of the metadata is emptied or ignored, and transmitted.

On the other hand, when the analysis server 130 has capability to perform the requested processing, detection processing is performed (step S118). The detection processing using the analysis server 130 will be described below.

[Detection Processing Using the Analysis Server 130 in the Monitoring System]

Figure 5:
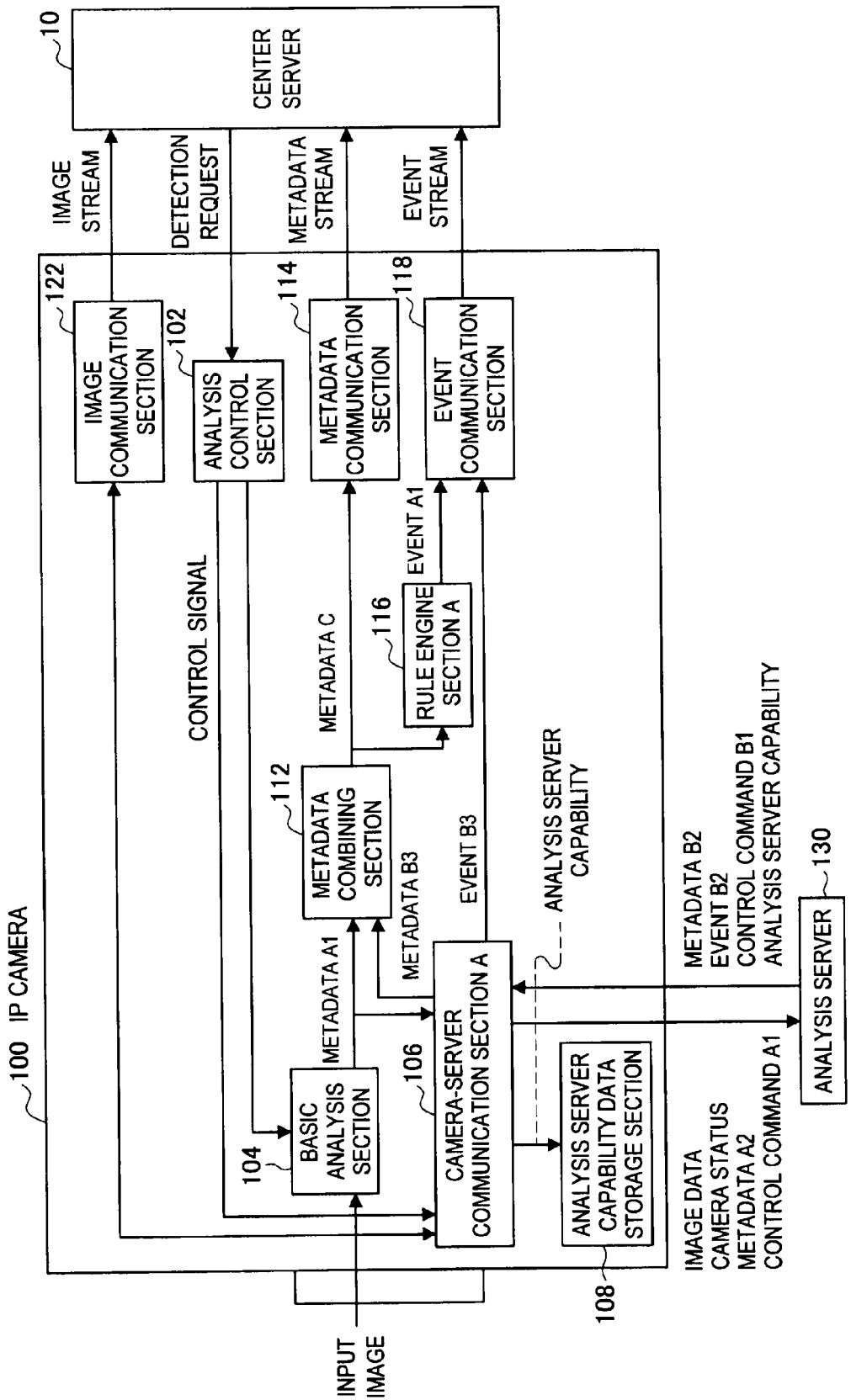
FIG. 5 is a block diagram illustrating the IP camera 100 according to the embodiment.
Figure 6:
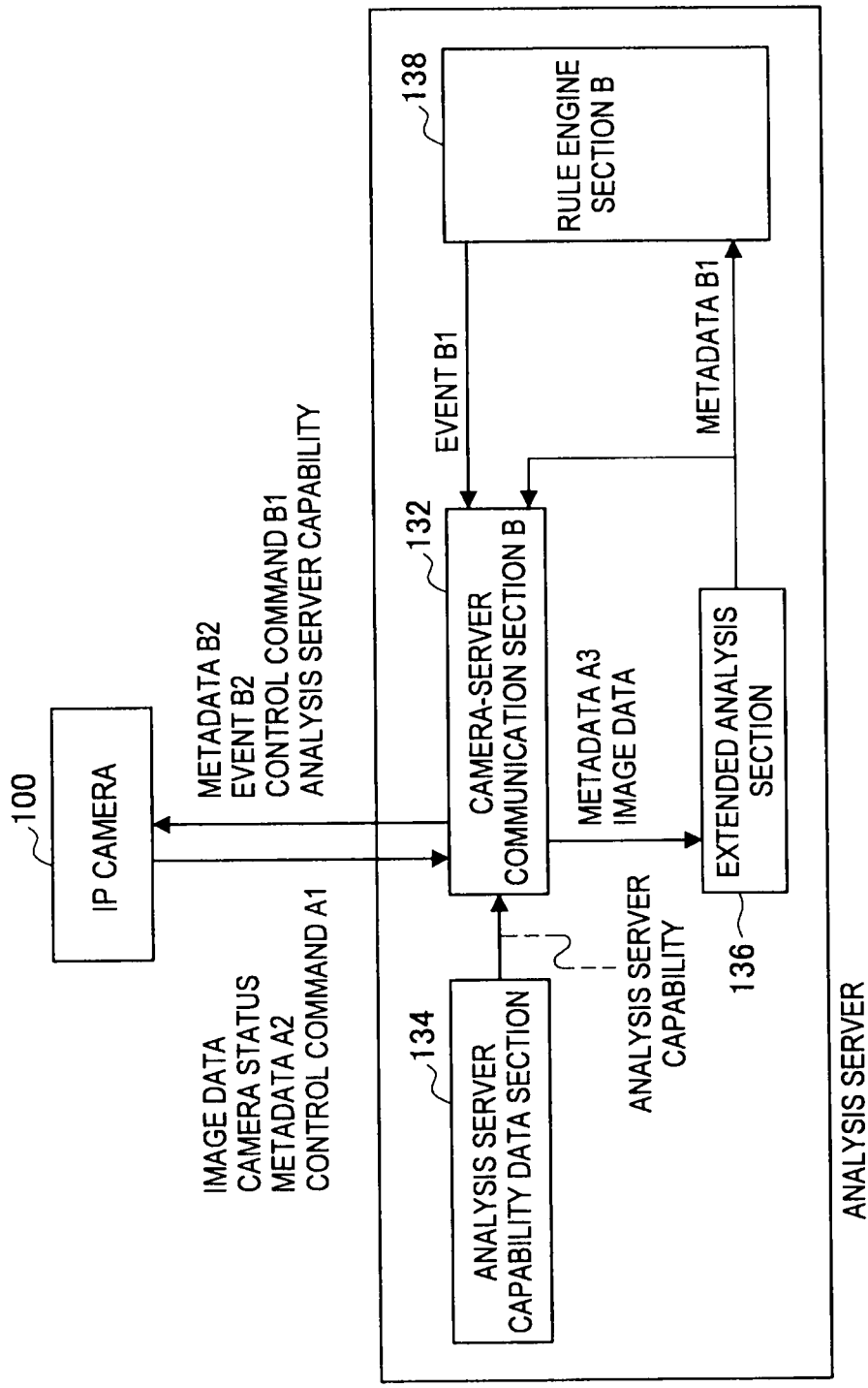
FIG. 6 is a block diagram illustrating the analysis server 130 according to the embodiment.

Next, the detection processing using the analysis server 130 in the monitoring system according to the embodiment will be described. FIG. 5 is a block diagram illustrating the IP camera 100 according to the embodiment. FIG. 6 is a block diagram illustrating the analysis server 130 according to the embodiment. For the sake of simplicity, a relationship between the IP camera 100 and the analysis server 130 will be mainly described. In FIGS. 5 and 6, and when describing the processing with reference to FIGS. 5 and 6, " . . . A" indicates that the IP camera 100 performs processing, and " . . . B" indicates that the analysis server 130 performs processing. " . . . C" indicates that the data is combined. The tailing numerals added to metadata and event are incremented every time the metadata or the event passes through a function block (" . . . section"), however the metadata or the event are basically the same data regardless of the tailing numerals.

A detection request from the center server 10 is sent to the analysis control section 102 of the IP camera 100. The analysis control section 102 sends a control signal to the basic analysis section 104 and the camera-server communication section A106 in accordance with the request.

When the analysis control section 102 determines that the analysis server 130 is necessary, the camera-server communication section A exchanges capabilities with the analysis server 130, and obtains analysis server capability stored in an analysis server capability data section of the analysis server 130. It is not necessary to exchange capabilities again unless the detection request changes. The obtained analysis server capability is recorded in the analysis server capability data storage section 108. The IP camera 100 communicate with the analysis server 130 having analysis server capability appropriate for the detection request.

The input image is sent to the basic analysis section 104 via an image capturing section constituted by an optical system such as lens, an image sensor (for example, CMOS image sensor and CCD image sensor), and the like. The basic analysis section 104 generates the metadata A1 using the input image by, for example, performing moving object detection processing. At this time, for example, among the metadata in the above described Table 1, information of circumscribed rectangle is obtained by the moving object detection processing.

The metadata A1 created in the basic analysis section 104 of the IP camera 100 is transmitted to the camera-server communication section A106. The camera-server communication section A106 in the IP camera 100 transmits/receives data to/from the camera-server communication section B132 in the analysis server 130.

The IP camera 100 transmits the image data, the camera status, the metadata A2, the control command A1, and the like to the analysis server 130. The image data is the input image. The input image may be converted into JPEG or the like, and the size of the image may be changed. The camera status indicates, for example, current pan/tilt/zoom values of the camera. The metadata A2 indicates the metadata generated in the basic analysis section 104 of the IP camera 100. The control command A1 indicates a parameter used for analysis in the analysis server 130.

The analysis server 130 transmits the metadata B2, the event B2, and the control command B1 to the IP camera 100. The metadata B2 is metadata generated in the extended analysis section 136 of the analysis server 130. For example, the extended analysis section 136 performs face detection processing and generates information such as a head position, a head orientation, positions of face parts, a face score, and the like, which are the metadata described in the above Table 1. By face analysis processing, face attributes such as male/female and age are obtained. Further, a face feature amount used for face matching processing is obtained.

The event B2 is information generated depending on whether or not the metadata B1 complies with a certain rule. The rule engine section B138 generates the event B1 by applying a rule, such as the object enters a certain area in the image or the object passes through a certain virtual line, and generates the event B1 depending on whether or not the object complies with the rule. Event generation and event processing are not essential functions in this embodiment.

The control command B1 is, for example, a command to change pan/tilt/zoom functions of the IP camera 100 when tracking processing is performed. The tracking processing is processing in which the IP camera 100 tracks an object by using a mechanism control function.

The metadata combining section 112 generates the metadata C by combining the metadata B3 transmitted from the analysis server 130 to the IP camera 100 and the metadata A1 obtained from the basic analysis section 104 in the IP camera 100. The metadata C is transmitted to the metadata communication section 114 (first metadata output section), and transmitted to the center server 10 as a metadata stream. The metadata A1 and the metadata B3 may not be combined in the IP camera 100 but transmitted separately, and they can be combined in the center server 10.

The metadata C is converted into the event A1 by the rule engine section A116, and transmitted to the center server 10 as an event stream by the event communication section 118. The input image is converted in the image communication section 122, and transmitted to the center server 10 as an image stream.

The center server 10 displays each received stream with GUI or the like to show as an alert to the user, and records data/image.

FIG. 5 illustrates that the network through which the IP camera 100 is connected to the center server 10 is different from the network through which the IP camera 100 is connected to the analysis server 130. In other words, in FIG. 5, to clarify the roles of the functions of each server, the functions of each server are illustrated as separate functional blocks. However, the embodiment is not limited to this configuration. For example, the IP camera 100 may be installed so that the IP camera 100 is connected to the center server 10 or the analysis server 130 through the same function block by switching the transmission address to the address of the center server 10 or the address of the analysis server 130. Specifically, the functions of the image communication section 122 and the metadata communication section 114 may be included in the camera-server communication section A106, and thus they can be integrated in one function block.

Figure 7:
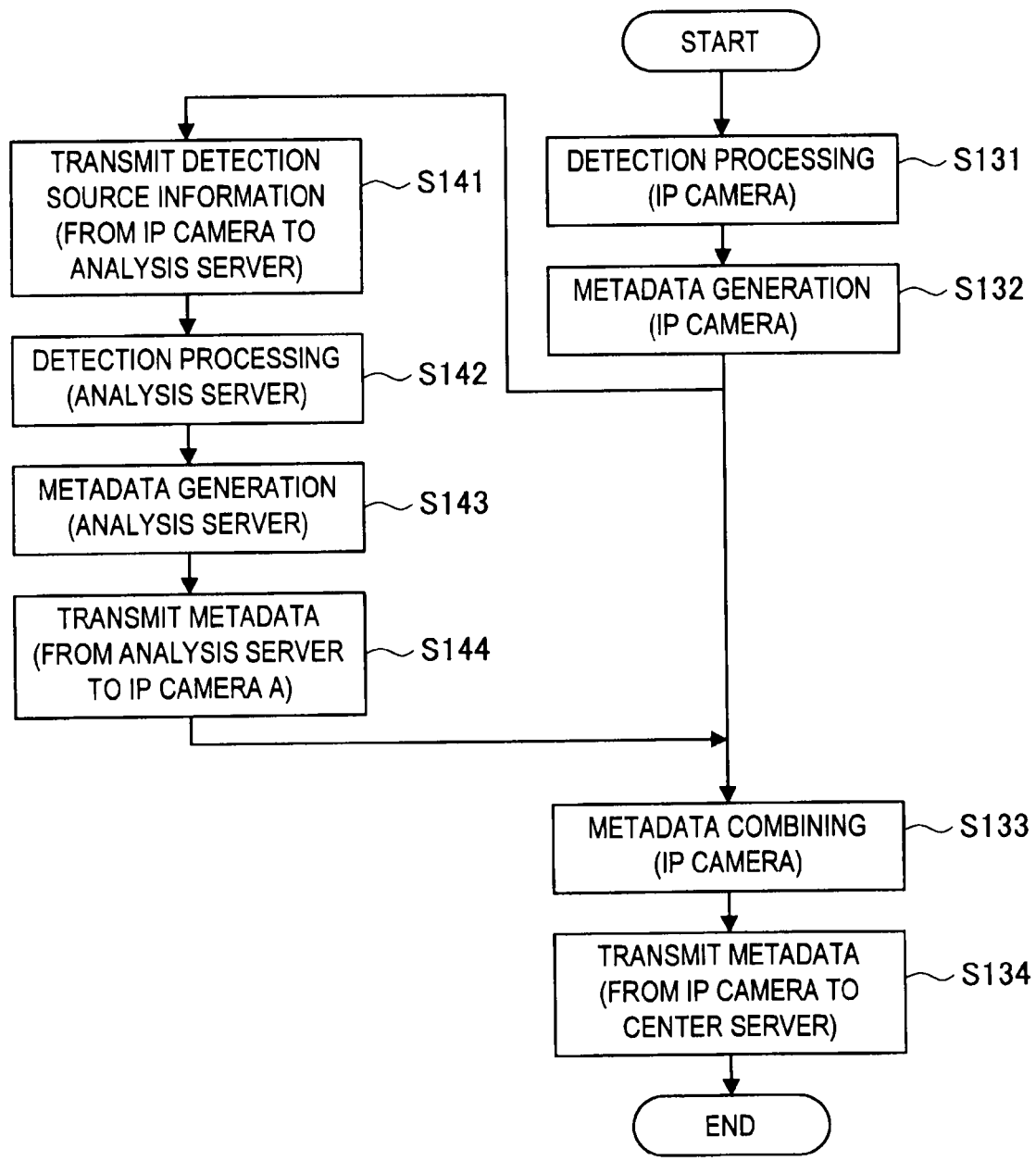
FIG. 7 is a flowchart illustrating an operation of detection processing using the analysis server 130 of the monitoring system according to the embodiment.

Next, an operation of the detection processing using the analysis server 130 of the monitoring system according to the embodiment will be described. FIG. 7 is a flowchart illustrating the operation of the detection processing using the analysis server 130 of the monitoring system according to the embodiment.

FIG. 7 is a flowchart illustrating the detection processing in step S118 in FIG. 4. FIG. 7 illustrates mainly a flow of metadata. Therefore, the description related to the rule engine section A116 and the rule engine section B138 will be omitted.

In the IP camera 100, the basic analysis section 104 of the IP camera 100 performs analysis processing and then performs detection processing (step S131). The basic analysis section 104 generates metadata A1 (step S132).

Thereafter, necessary information related to detection source information is transmitted from the camera-server communication section A106 of the IP camera 100 to the camera-server communication section B132 (second metadata output section) of the analysis server 130 (step S141). Here, the necessary information includes the image data, the camera status, the metadata A2, and the control command A1.

The detection processing is performed in parallel in the IP camera 100 and in the analysis server 130.

In the analysis server 130, the extended analysis section 136 performs analysis processing and then performs detection processing (step S142). The extended analysis section 136 generates metadata B1 (step S143). The analysis server 130 transmits the metadata B1 generated in the extended analysis section 136 to the camera-server communication section B132, and transmits the metadata B2 from the camera-server communication section B132 to the IP camera 100 (step S144).

Thereafter, in the IP camera 100, the metadata combining section 112 generates the metadata C by combining the metadata A1 and the metadata B3 (step S133). The metadata A1 and the metadata B3 may not be combined in the IP camera 100 and may be combined in the center server 10.

The IP camera 100 transmits the metadata C to the center server 10 (step S134). The above operation is performed for each processing frame. The processing frame may include the same number of normal image frames or may include an appropriately reduced number of image frames.

[Collaboration Method Between the IP Camera 100 and the Analysis Server 130]

Figure 8:
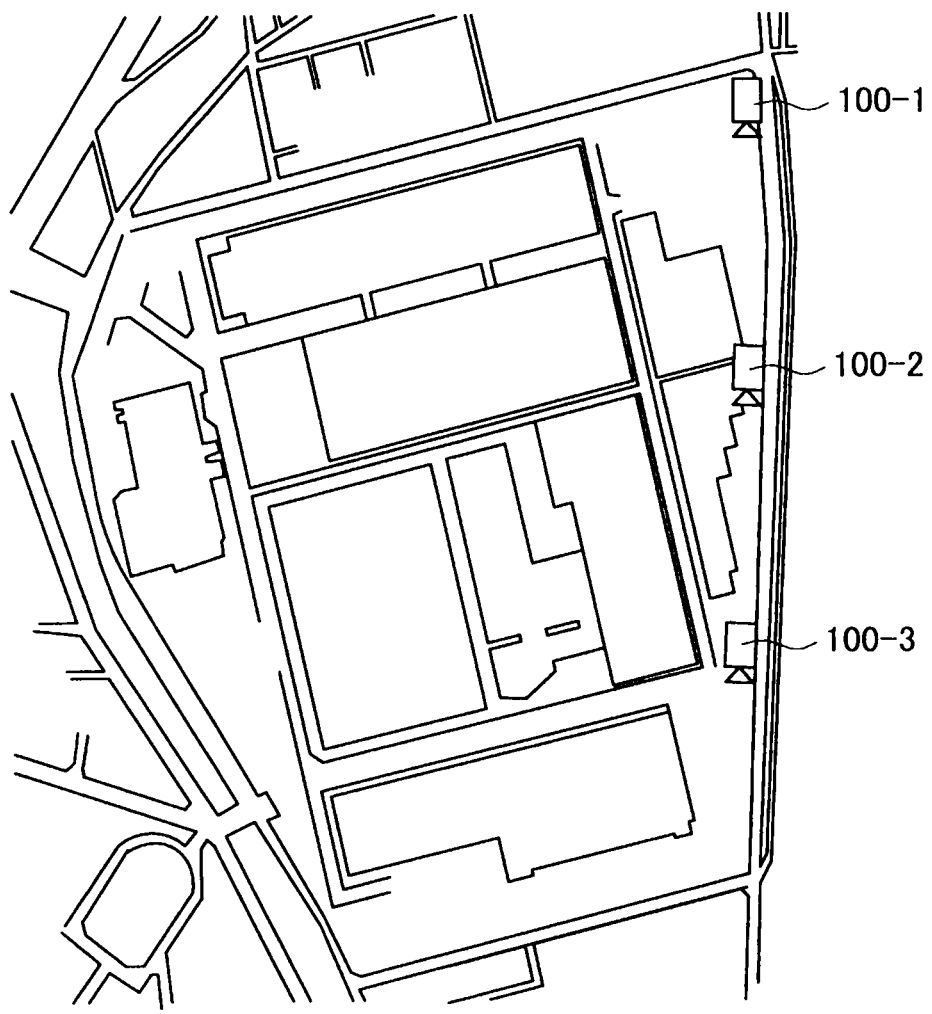
FIG. 8 is an explanatory diagram illustrating an installation example of the IP cameras 100.

Next, an efficient collaboration method when a plurality of IP cameras 100 and the analysis server 130 are connected to each other will be described. FIG. 8 is an explanatory diagram illustrating an installation example of the IP cameras 100. In FIG. 8, a plurality of IP cameras 100 (here, three IP cameras of the IP camera 100-1, the IP camera 100-2, and the IP camera 100-3) are arranged along the outer circumference of a vigilance area.

FIG. 9 is an explanatory diagram illustrating captured image examples of a person Obj1 and a vehicle Obj2 captured by each IP camera 100.

Figures 3, 9A:
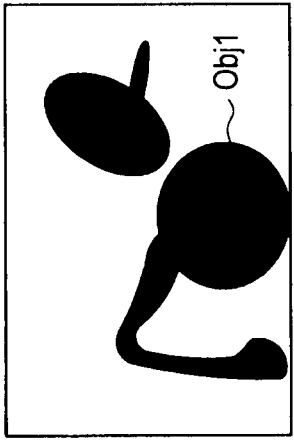
Figures 2, 9A:
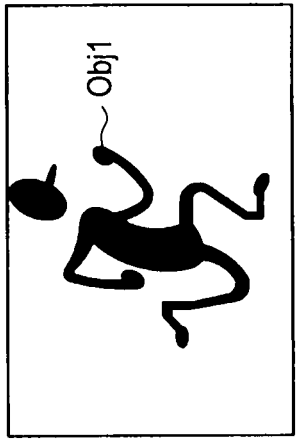
Figures 1, 9A:
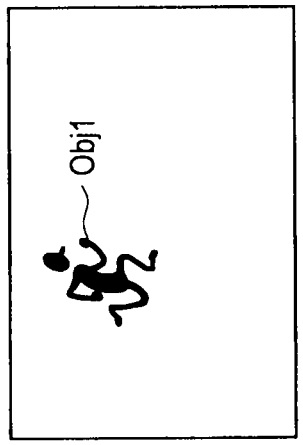

When position calibration is performed on the IP cameras 100, whether or not the motion areas captured by each IP camera 100 are the same can be calculated. Alternatively, by referring to color information and shape information of a target object, the target object can be identified. Using the above fact, the metadata generated in the extended analysis section 136 based on image data from the IP camera 100-3 is combined with the metadata based on the IP camera 100-1. As a result, for example, it is possible to output a face attribute of the target object (person Obj1) which is too small to obtain the face attribute in the IP camera 100-1 as illustrated in FIG. 9a-1, as the metadata of the IP camera 100-1.

As described above, the center server 10 performs as if it were connected only to the IP cameras 100. This is because metadata which is generated by the analysis server 130 and the IP camera 100-3 and is difficult to be generated by the IP camera 100-1 can be output as if the metadata were generated by the IP camera 100-1.

Figures 3, 9B:
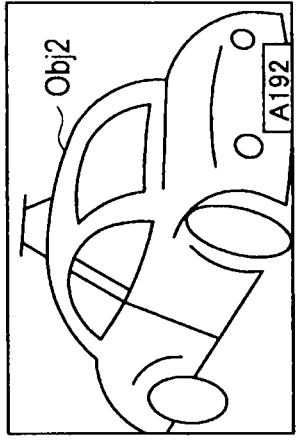
Figures 2, 9B:
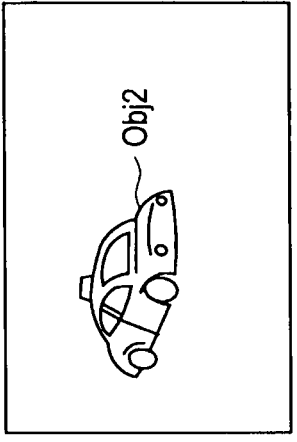
Figures 1, 9B:
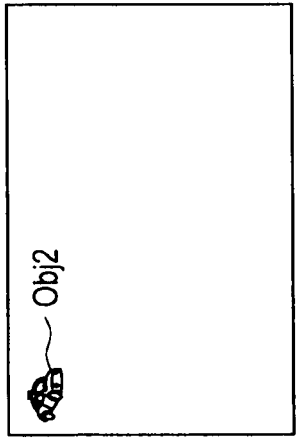

In a similar way, for example, even when the target object (vehicle Obj2) is so small as illustrated in FIG. 9b-1 in the image that the license plate number is difficult to recognize, it is possible to generate metadata to which information of the license plate number is added by using the analysis server 130 and the IP camera 100-3 and output the metadata from the IP camera 100-1.

[Relationship Between a Plurality of IP Cameras 100 and the Analysis Server 130]

Figure 10:
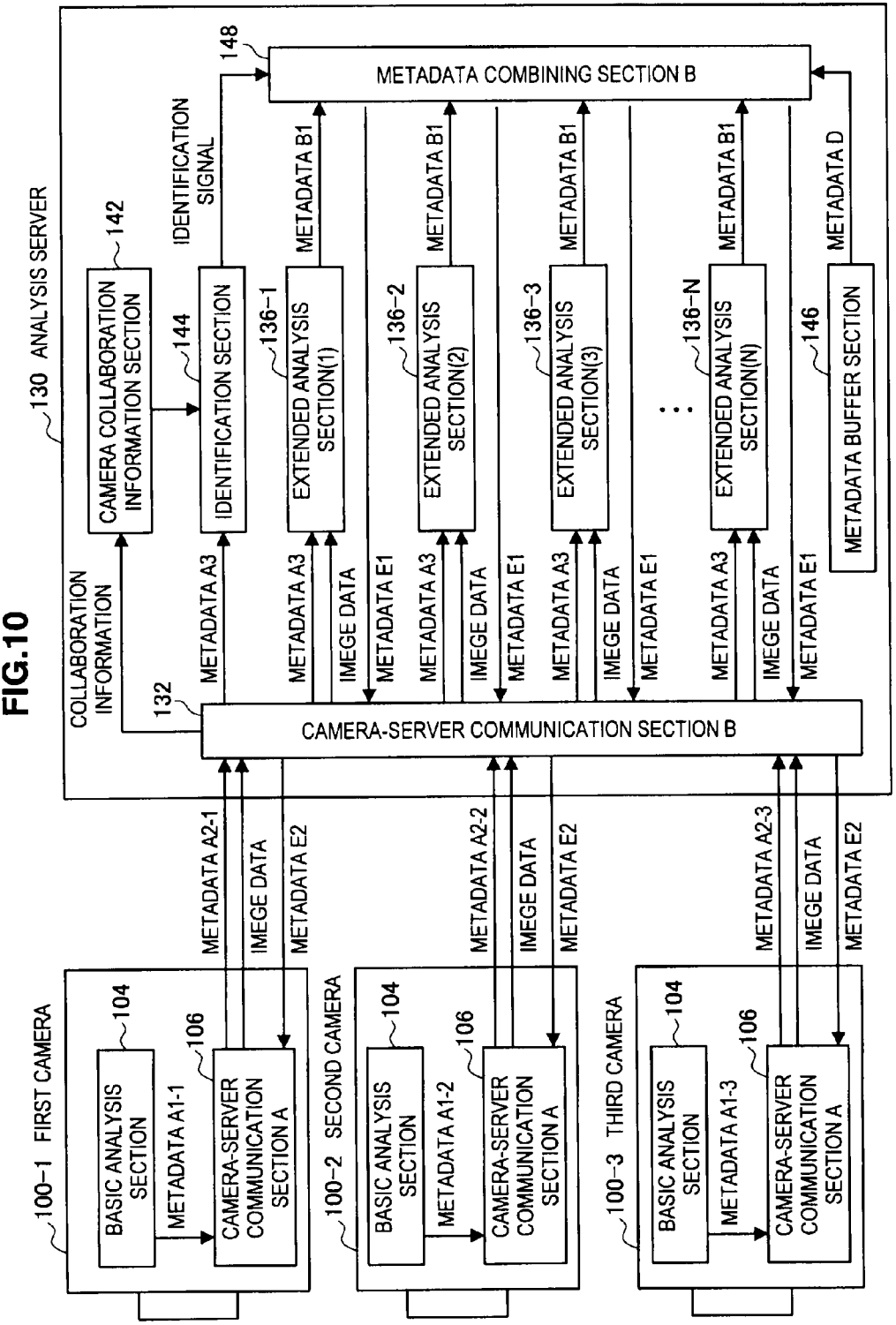
FIG. 10 is a block diagram illustrating a plurality of IP cameras 100 and the analysis server 130 according to the embodiment.

Next, a relationship between a plurality of IP cameras 100 and the analysis server 130 according to the embodiment will be described. FIG. 10 is a block diagram illustrating a plurality of IP cameras 100 and the analysis server 130 according to the embodiment. In an example of FIG. 10, a case will be described in which there are three IP cameras 100 that are the first camera 100-1, the second camera 100-2, and the third camera 100-3. The number of the installed IP cameras 100 is not limited to the number of the IP cameras 100 in the example illustrated in FIG. 10.

The basic analysis section 104 of the first camera 100-1 (in the same way, of the second camera 100-2, of the third camera 100-3) generates the metadata A1-1 (the metadata A1-2, the metadata A1-3).

The camera-server communication section A106 receives the generated metadata A1-1 (the metadata A1-2, the metadata A1-3), image data, and the like, and transmits the metadata A2-1 (the metadata A2-2, the metadata A2-3), the image data, and the like to the analysis server 130. The camera-server communication section A106 receives the metadata E2 generated by the analysis server 130 from the analysis server 130.

The camera-server communication section B132 of the analysis server 130 receives the metadata A2 (the metadata A2-1, the metadata A2-2, the metadata A2-3) and the image data from each IP camera 100 (the first camera 100-1, the second camera 100-2, the third camera 100-3). The camera-server communication section B132 transmits the metadata E2 to each IP camera 100.

The camera collaboration information section 142 of the analysis server 130 receives collaboration information such as position calibration data of each IP camera 100 (the first camera 100-1, the second camera 100-2, the third camera 100-3) from the IP cameras 100, and holds the collaboration information in advance.

The identification section 144 determines whether or not the target objects represented by the metadata generated by each IP camera 100 are identical to one another based on the metadata from the IP cameras 100.

The extended analysis section (N) 136-N performs analysis processing such as person detection, face detection, and face authentication, and generates the metadata B1. The extended analysis section (N) 136-N indicates that each extended analysis section of individual function block has a different function from one another. For example, the extended analysis section (1) 136-1 has a function of person detection, the extended analysis section (2) 136-2 has a function of face detection, the extended analysis section (3) 136-3 has a function of face authentication, and the like.

The metadata combining section B148 combines each metadata generated based on the data from the IP cameras 100 with metadata information obtained by other IP cameras 100 based on the identification signal generated by the identification section 144. For example, the metadata combining section B148 combines the metadata generated based on the data from the first camera 100-1 with the metadata information obtained by the second camera 100-2 and the third camera 100-3 based on the identification signal generated by the identification section 144.

The metadata buffer section 146 stores metadata of other IP cameras 100 and metadata at other times of the IP camera 100 itself, and uses these metadata when combining metadata.

[Operation Related to Collaboration Between a Plurality of IP Cameras 100 and the Analysis Server 130]

Operation related to collaboration between a plurality of IP cameras 100 and the analysis server 130 will be described. FIG. 11 is a flowchart illustrating an operation related to collaboration between a plurality of IP cameras 100 and the analysis server 130 according to the embodiment. The flowchart illustrated in FIG. 11 does not include the preliminary transmission of camera collaboration information to the analysis server 130. Since each IP camera 100 has the same processing flow, the description of the same processing flow will be omitted in this flowchart. FIG. 11 is a flowchart illustrating the detection processing in step S118 in FIG. 4.

First, in each IP camera 100, the basic analysis section 104 of the IP camera 100 performs analysis processing and then performs detection processing (step S131). The basic analysis section 104 generates metadata A1 (step S132).

Thereafter, necessary information related to detection source information is transmitted from the camera-server communication section A106 of the IP camera 100 to the camera-server communication section B132 of the analysis server 130 (step S141). Here, the necessary information includes the image data, the camera status, the metadata A2, and the control command A1.

The detection processing is performed in parallel in the IP camera 100 and in the analysis server 130. In the analysis server 130, two types of flows are performed in parallel.

In the analysis server 130, the extended analysis section 136 performs analysis processing and then performs detection processing (step S142). The extended analysis section generates metadata B1 (step S143).

The generated metadata B1 is stored in the metadata buffer section 146 (step S151). The stored metadata B1 is called as metadata D by the metadata combining section B148 in step S162.

On the other hand, identification processing is performed by using the metadata A3 transmitted from the IP camera 100 to the analysis server 130 via the camera-server communication section B132 and the camera collaboration information held in the camera collaboration information section 142 (step S161). In the identification processing, the same target object is searched from metadata of other cameras and metadata at other times of the camera in current use in the metadata buffer section 146.

Metadata of the target object identified to be the same in a plurality of IP cameras 100 is called from the metadata buffer section 146 (step S162).

Thereafter, the metadata combining section B148 combines the metadata B1 generated in the extended analysis section 136-N and the metadata D called from the metadata buffer section 146 (step S171).

The analysis server 130 transmits the metadata B1 generated in the extended analysis section 136 to the camera-server communication section B132, and transmits the metadata B2 from the camera-server communication section B132 to the IP camera 100 (step S144).

Thereafter, in the IP camera 100, the metadata combining section 112 generates the metadata C by combining the metadata A1 generated in the IP camera 100 and the metadata B3 transmitted from the analysis server 130 (step S133). The metadata A1 and the metadata B3 may not be combined in the IP camera 100 but may be combined in the center server 10.

The IP camera 100 transmits the combined metadata C to the center server 10 (step S134). The above operation is performed for each processing frame. The processing frame may include the same number of normal image frames or may include an appropriately reduced number of image frames.

[About Viewer]

Next, the viewer displayed on the monitor 12 or a screen of the client 30 in the monitoring system according to the embodiment will be described. FIG. 12 is an explanatory diagram illustrating viewers 180 displayed on the monitor 12 or the screen.

The viewer 180 includes, for example, a camera image panel 182, a control panel 184, an alert list panel 186, and the like.

The camera image panel 182 arranges and displays images of a plurality of IP cameras 100. Although the camera image panel 182 is a matrix of 2 by 2 in FIG. 12, the embodiment is not limited to this. For example, the camera image panel 182 may be a matrix of one by one, a matrix of 16 by 16, or a matrix of 2 by 3. Here, although the camera images are displayed on one monitor 12 by dividing the monitor screen, the image of each IP camera 100 may be individually displayed on one monitor 12 by using a plurality of monitors 12. For example, the image of one IP camera 100 can be displayed on one monitor 12.

The control panel 184 is constituted by a GUI which performs controls such as a PTZ setting of the IP camera 100 and a recording setting of the center server 10.

The alert list panel 186 displays a list of alerts generated in the IP camera 100 or the center server 10.

Figure 12A:
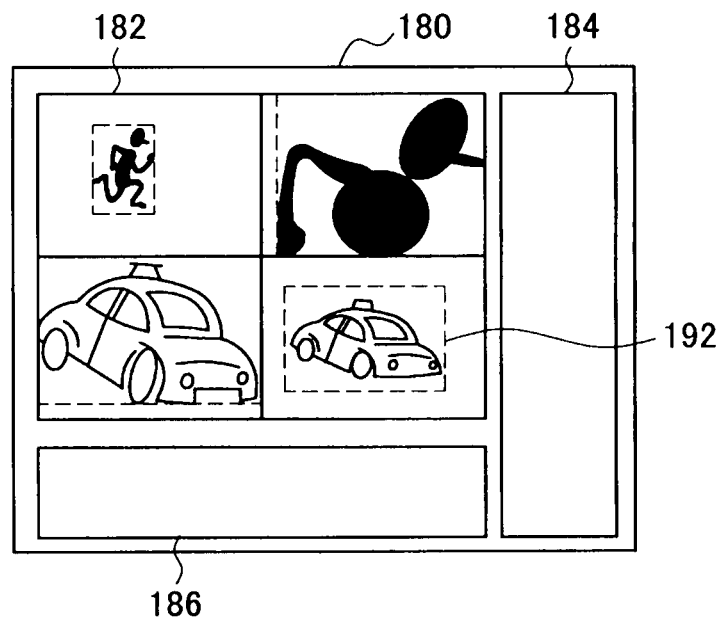
FIG. 12 is an explanatory diagram illustrating viewers 180 displayed on a monitor 12 or a screen.

FIG. 12A is an explanatory diagram illustrating a state when the detection processing of the analysis server 130 is turned off. When the detection processing of the analysis server 130 is turned off, a detection frame 192 (dashed line portion) is displayed on the target objects of the IP cameras in the camera image panel 182. At the same time, alerts and metadata are displayed on the alert list panel 186.

Figure 12B:
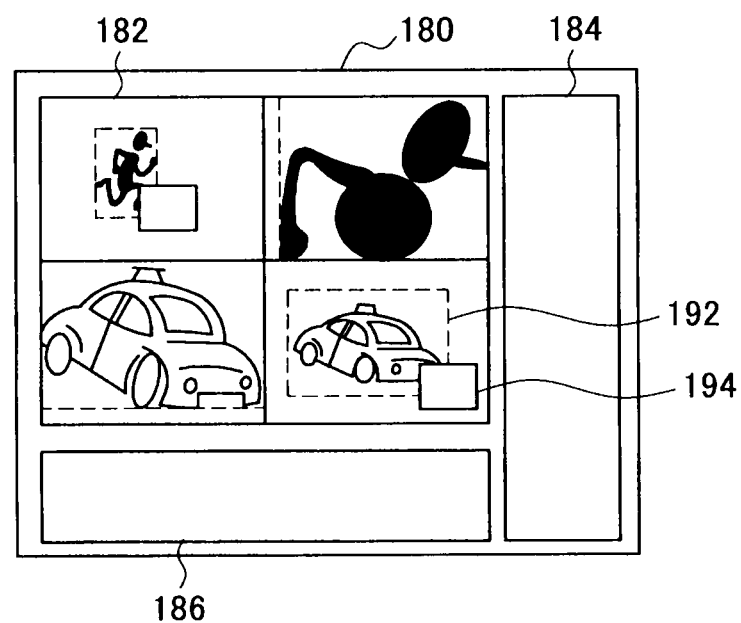

FIG. 12B is an explanatory diagram illustrating a state when the detection processing of the analysis server 130 is turned on. When the detection processing of the analysis server 130 is turned on, the detection frame 192 is displayed on the target objects of the IP cameras in the camera image panel 182, and further additional information 194 can be displayed. For example, when the target object is a person, a name which is checked based on another IP camera 100 and registered in a database is displayed as the additional information 194. When the target object is a vehicle, information of the license plate number which is checked in another IP camera 100 is displayed as the additional information 194. At the same time, alerts and metadata to which the name and the license plate number, which are registered as detailed information, are added are displayed on the alert list panel 186.

Effects of the Embodiment

As described above, the embodiment is related to a generation method of metadata generated in the IP camera 100 by the request from the center server 10. In the embodiment, processing is efficiently shared by a plurality of IP cameras 100 and the analysis server 130, and metadata is generated.

According to the embodiment, the center server 10 can perform operation without being conscious of the presence of the analysis server 130. When the analysis server 130 and the IP camera 100 are connected to each other, an amount of information and an amount of content of the requested metadata increase when seen from the center server 10. On the other hand, when the analysis server 130 and the IP camera 100 are not connected to each other, the requested metadata includes a minimum amount of information and a minimum amount of content when seen from the center server 10.

When a plurality of IP cameras 100 are connected to the analysis server 130, information which is difficult for the IP camera in current use to obtain can be added to metadata via the analysis server 130 if another IP camera 100 captures the same target object as that of the IP camera in current use. As a result, even when one IP camera 100 itself does not have a high level analysis capability, the IP camera can perform as if it has a high level analysis capability when seen from the center server 10.

It should be understood by those skilled in the art that various modifications, combinations, sub-combinations and alterations may occur depending on design requirements and other factors insofar as they are within the scope of the appended claims or the equivalents thereof.

The present application contains subject matter related to that disclosed in Japanese Priority Patent Application JP 2009-123413 filed in the Japan Patent Office on May 21, 2009, the entire content of which is hereby incorporated by reference.

What is claimed is:

1. A monitoring system comprising:
a plurality of image capturing apparatuses, each image capturing apparatus including
an image capturing circuit that captures an image illustrating a head and a face of a person,
an analysis circuit that analyzes the image captured by the image capturing circuit and generates first metadata, the first metadata including a circumscribed rectangle according to moving object detection processing on the image, and
a first metadata output circuit that outputs the first metadata and second metadata to a monitoring apparatus via a network, the second metadata being different from the first metadata; and
an analysis apparatus including
a plurality of extended analysis circuits that each analyzes an image captured by a different one of the image capturing apparatuses to generate the corresponding second metadata that specifies a head orientation of the head and positions of facial features of the face in at least one of the circumscribed rectangle and the analyzed image, the head orientation being information of a roll, a pitch or a yaw of the head within the analyzed image,
a metadata combining circuit that generates combined metadata by combining the second metadata generated by a first extended analysis circuit for a first image capturing apparatus of the plurality of image capturing apparatuses and the second metadata generated by a second extended analysis circuit for a second image capturing apparatus of the plurality of image capturing apparatuses, and
a second metadata output circuit that outputs the second metadata to each of the image capturing apparatuses and outputs the combined metadata to the one of the image capturing apparatuses.

2. The monitoring system according to claim 1, wherein the image capturing apparatus and the analysis apparatus exchange capability information according to a simple object access protocol (SOAP).

3. The monitoring system according to claim 1, wherein the image capturing apparatus and the analysis apparatus exchange capability information prior to generating at least one of the first metadata and the second metadata.

4. The monitoring system according to claim 1, wherein each of the plurality of image capturing apparatuses captures a different view of the person, and each of the plurality of image capturing apparatuses generates additional metadata, that is different from the first and second metadata, based on the different views of the person.

5. The monitoring system according to claim 4, wherein
the different views of the person from each of the plurality of image capturing apparatuses are displayed concurrently in a camera image panel, and
the additional metadata from each of the plurality of image capturing devices are displayed in an alert list panel.

6. The monitoring system according to claim 4, wherein the additional metadata specifies a name of the person.

7. An image capturing apparatus comprising:
an image capturing circuit that captures an image illustrating a head and a face of a person;
an analysis circuit that analyzes the image captured by the image capturing circuit and generates first metadata, the first metadata including a circumscribed rectangle according to moving object detection processing performed on the image;
a first metadata output circuit that outputs the first metadata and second metadata to a monitoring apparatus via a network, wherein
the second metadata is generated in an extended analysis circuit in an analysis apparatus, the second metadata including information of a head orientation of the head and positions of facial features of the face in at least one of the circumscribed rectangle and the image, the head orientation being information of a roll, a pitch or a yaw of the head within the analyzed image; and
a receiving circuit that receives combined metadata from the analysis apparatus,
wherein the combined metadata is generated at the analysis apparatus by combining the generated second metadata with second metadata generated at the analysis apparatus for one or more other image capturing apparatuses,
wherein the second metadata for the one or more other image capturing apparatuses specifies a head orientation of the head of the person.

8. The image capturing apparatus according to claim 7, further comprising:
a metadata combining circuit that combines the first metadata and the second metadata to generate second combined metadata, wherein
the first metadata output section outputs the second combined metadata to the monitoring apparatus.

9. An analysis apparatus comprising:
an extended analysis circuit that
receives image data and first metadata from a plurality of image capturing apparatuses, the first metadata including a circumscribed rectangle according to moving object detection processing on the image data, and
analyzes an image captured by one of the image capturing apparatuses to generate second metadata that specifies a head orientation of the head and positions of facial features of the face in at least one of the circumscribed rectangle and the analyzed image, the head orientation being information of a roll, a pitch or a yaw of the head within the analyzed image;
a metadata combining circuit that generates combined metadata by combining the second metadata generated for the one image capturing apparatus and other second metadata generated for another image capturing apparatus of the plurality of image capturing apparatuses; and
a metadata output circuit that outputs the second metadata to each of the image capturing apparatuses and outputs the combined metadata to one of the image capturing apparatuses.

10. The analysis apparatus according to claim 9, wherein
the extended analysis circuit is one of a plurality of extended analysis circuits included in the analysis apparatus,
each extended analysis circuit of the plurality of extended analysis circuits analyzes an image captured by a different one of the image capturing apparatuses to generate corresponding second metadata, and
the metadata combining circuit combines the second metadata generated by a first extended analysis circuit of the plurality of extended analysis circuits with the second metadata generated by a second extended analysis circuit of the plurality of extended analysis circuits.

11. A monitoring method comprising:
analyzing, by an image capturing apparatus, an image captured by an image capturing circuit of the image capturing apparatus, the image illustrating a head and a face of a person, and generating first metadata;
generating, by the image capturing apparatus, first metadata, the first metadata including a circumscribed rectangle according to moving object detection processing on the image;
analyzing, by an analysis apparatus, the image captured by the image capturing circuit of the image capturing apparatus;
generating, by the analysis apparatus, second metadata that specifies a head orientation of the head and positions of facial features of the face in at least one of the circumscribed rectangle and the analyzed image, the head orientation being information of a roll, a pitch or a yaw of the head within the analyzed image;
generating combined metadata by combining the second metadata and other second metadata, the other second metadata generated for another image capturing apparatus;
outputting, by the analysis apparatus, the second metadata and the combined metadata to the image capturing apparatus;
outputting, by the image capturing apparatus, the first metadata and the second metadata to a monitoring apparatus via a network.

12. The monitoring method according to claim 11, further comprising:
tracking the person according to the images of a plurality of image capturing apparatuses;
generating in real-time, by at least one of the plurality of image capturing apparatuses, additional metadata that is different from the first and second metadata, based on the tracking; and
displaying views of the tracked person obtained by the plurality of image capturing apparatuses with the additional metadata.

13. The monitoring method according to claim 12, wherein the additional metadata specifies license plate information corresponding to the person.

\* \* \* \* \*